Aug. 8, 1933.  H. L. EASTMAN  1,921,385
DUPLEX CONTROL SYSTEM
Filed Sept. 30, 1932
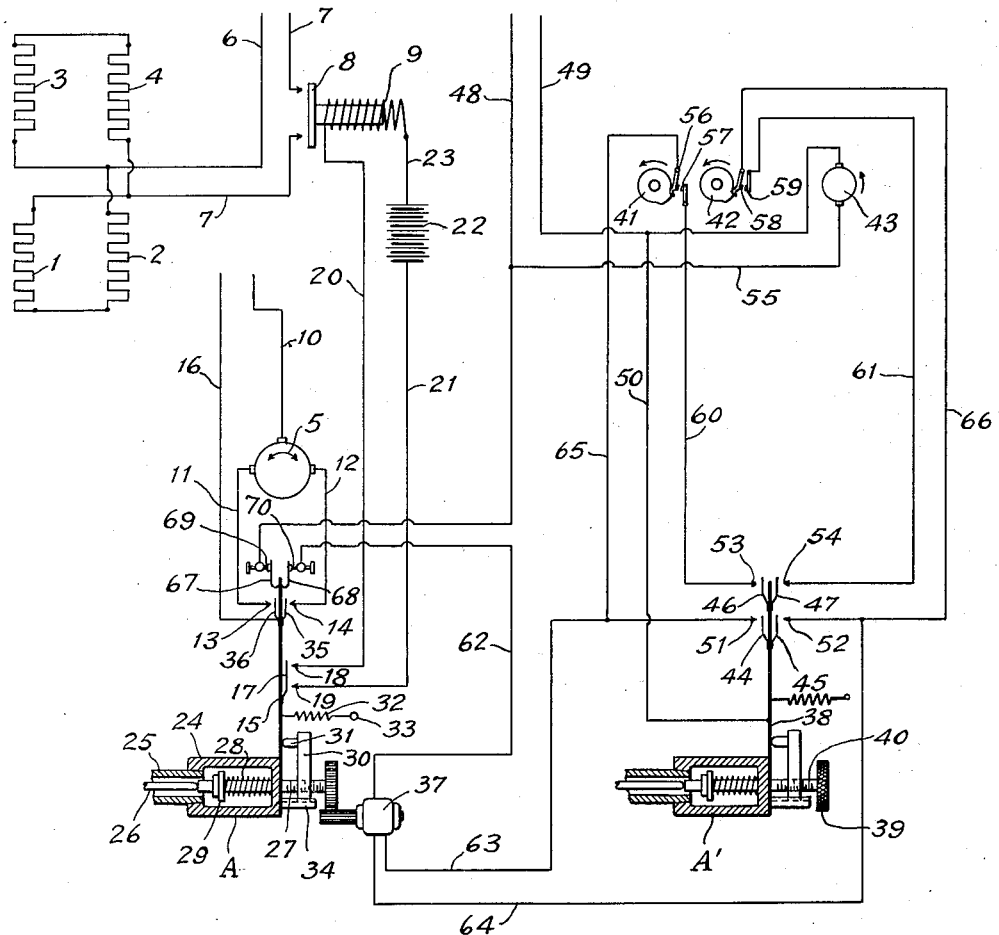
Witness:
A. A. Horn
Inventor
Harold L. Eastman
by Brown & Parham
Attorneys.

Patented Aug. 8, 1933

1,921,385

UNITED STATES PATENT OFFICE 1,921,385

DUPLEX CONTROL SYSTEM

Harold L. Eastman, Hartford, Conn., assignor to Hartford-Empire Company, Hartford, Conn., a Corporation of Delaware Application September 30, 1932
Serial No. 635,478

11 Claims. (Cl. 236—15)

This invention relates to the method of and apparatus for controlling the magnitude of a condition which may be temperature, pressure, level, voltage, or other physical or chemical conditions.

More specifically, my invention relates to a duplex system of control of the magnitude of condition tending to the establishment and maintenance of a predetermined selected magnitude therefor at a particular point. As such, the present invention is an improvement upon the device and method disclosed in the patent to Wadman 1,802,991, granted April 28, 1931, and also upon the pending application of Wadman, Serial No. 441,793, filed April 5, 1930 for Method of and apparatus for annealing glassware, and a division thereof relating specifically to an automatic control system, this divisional application being identified as Serial No. 628,713, filed August 13, 1932 for Method of and apparatus for controlling temperature.

In the Wadman patent and applications above referred to a system of automatic control is disclosed relating particularly to temperature control. For this reason I have chosen to illustrate and describe my present invention as applied to a system of temperature control, although it is to be understood that the invention is not limited in its application to the control of temperature.

It has been found in practice in working with control devices built substantially in accordance with the teaching of the copending Wadman applications above mentioned that the adjustment of the range of the first or primary thermostat by the second thermostat, which latter is responsive predominantly to the temperature which it is desired to maintain constant, is sometimes more rapid than it should be, resulting in too large a direct adjustment of the range of the first thermostat, especially as regards the actual conditions surrounding this thermostat. As a result, it has been found that due to this mal-adjustment, there is an extended delay in changing from the requirement to adjust the temperature-affecting means in one direction to the other, this in turn resulting in the actual temperature at the point where constant temperature is desired, wandering first to one side and then to the other from that desired, this in practice being known as "hunting".

A specific object of this invention, therefore, is to provide method and means usable in combination with the structure and teaching of the Wadman applications above referred to by which the range adjustment for the first or primary thermostat is limited in its operation so that it can at no time set this range more than a predetermined amount in one direction or the other different from the actual conditions existing at the primary thermostat.

Further objects and advantages of the present invention include certain adjustments and details of construction and method, all of which will be more apparent from a reading of the following specification and sub-joined claims when taken in connection with the accompanying drawing in which—

The single figure illustrates diagrammatically a simplified control system and wiring diagram therefor embodying my present invention as applied to temperature control of the type disclosed in the copending applications of Wadman.

While my invention may be broadly considered as a method and apparatus for controlling the magnitude of a condition, which may be of any character, whether physical or chemical, it is more particularly directed to controlling the magnitude of some condition, for example, the temperature of a material, in which it is desired to establish and maintain a predetermined selected temperature at a given point in a system, and in which the means which actually affect the temperature or vary it are effective not at the point at which it is desired to establish and maintain the predetermined selected temperature, but at some prior point in the path of movement of the material, which may be described as controlling a "supply condition" in that the actual temperature affecting means (considering the system from the point of view of controlling temperature) directly controls not the temperature at the point at which it is desired to maintain a predetermined temperature, but preferably controls a temperature of the material at a point in its path of movement prior to that at which it is desired to maintain the predetermined selected temperature. (Thus actual temperature affecting means used control a "supply".)

Another possible application of the system, including the present invention, would be to a situation wherein a receptacle such, for example, as a bowl used to contain a pool of glass to supply a forming machine of the suction type, is being filled from a second receptacle by a pouring process due to the continued tipping of the second receptacle. In this case the condition to be maintained would be the level of the liquid, for example, the glass, in the first-named receptacle or bowl and the "supply condition", the level of the liquid in the second receptacle, that is, in the receptacle from which the glass is being poured into the bowl. Thus by controlling the level in the second receptacle and the variation in this level, the rate of supply of the liquid to the first receptacle would be controlled, which in turn could be maintained at the desired point to compensate exactly for withdrawals from the first receptacle.

In any case, the magnitude of the supply condition must be such as to be a directly contributing factor to the magnitude of the condition which is to be established and maintained rather than some distant and relatively unrelated factor, and the system to which my invention pertains is one in which control is effective on the supply condition in order to establish and maintain a desired magnitude for a condition directly dependent upon the magnitude of this supply condition.

The system shown in the accompanying drawing is adapted to be applied to a glass annealing lehr, such for example as that forming the subject matter of the Wadman application 441,793 above referred to. As disclosed in that application, there is a zone adjacent to the ware-entering end of the lehr in which the glass is to be brought from the temperature condition at which it enters, which may vary between relatively wide limits, to a predetermined desired temperature condition, which may be either above or below the entering temperature. For this reason, there is disclosed in the Wadman application means for supplying heat to or abstracting heat from the glass in a zone prior to the point at which its temperature is to be established and maintained at a fixed magnitude. It is believed unnecessary in connection with the present invention to show or describe the complete details of the glass annealing lehr forming the subject matter of the Wadman application, as the lehr per se forms no part of the present invention. Sufficient be it to say that the means for supplying heat in the Wadman application comprise a system of electric heating coils of the resistance type, and the means for abstracting heat comprise a muffle flue system adjacent to the path of movement of the ware and adapted to conduct therethrough a current of cooling air drawn from the atmosphere by a suction fan. In connection with this cooling or abstraction of heat, there are a pair of dampers which are adapted to be opened or closed simultaneously by a reversible electric motor operated by the control system disclosed in that application. It is deemed sufficient for the purpose of the present disclosure, therefore, to indicate diagrammatically a plurality of resistance electric heating elements and to illustrate diagrammatically a reversible electric motor, which will be understood as one which may be connected to operate one or more dampers, in connection with the electric circuits for supplying energy to the heating elements and for operating the motor in one direction or the other, as may be necessary.

Referring now to the single figure of the drawing, I have shown at 1, 2, 3 and 4 a plurality of electric heating elements of the resistance type which may be arranged in any suitable manner so that heat generated therein will pass to the material to which heat is at times to be supplied. I have also shown at 5 an electric motor indicated by a circle and having a double-headed arrow therein to indicate its reversible character. It will be understood that the motor 5 may be suitably connected to one or more dampers which control the flow of a cooling medium in proximity to the ware so as to abstract heat therefrom when the dampers are opened to permit such flow. It may in some instances be desirable to use a motor, as that shown at 5, for operating the dampers of the cooling system in which a maintaining switch is used for maintaining the motor in operation during the period that this motor makes a predetermined portion of a revolution, such as a half-revolution, in combination with a cut-off switch effective to cut off the motor after this predetermined portion of the revolution has been made and until a separate and independent circuit is subsequently made, at which time another portion of a revolution, as a half a revolution in the other direction, will take place. The maintaining switch and limit switches for the motor 5 have not been shown in the diagrammatic representation of the circuit in the accompanying drawing, as these are common means well known in the art, and no invention is predicated on this particular use of such means. Also, in connection with the circuit shown in the drawing, means to prevent arcing at the contact points and chattering of the contacting members have not been specifically shown, although such means may, and preferably are, used in practice in order to provide for positive making and breaking of the several circuits and to prevent "hunting". Furthermore, the circuits have been split up as far as possible to render then simple in order that they may be easily understood.

As shown in the drawing, the heating elements 1, 2, 3 and 4 are connected to line wires 6 and 7. A relay operated switch is interposed in the wire 7, which is effective to break the circuit to all the heating elements simultaneously, the switch being generally indicated at 8 and being illustrated as a bridging member movable toward and away from the switch points to which the two portions of the wire 7 are connected in response to the energization and de-energization of the solenoid coil 9. When current is caused to flow through the coil 9, the bridging member of the switch 8 will be moved to bridge the gap between the portions of wire 7 and current will pass through the heating elements 1 to 4 inclusive, thus supplying heat to the material to be heated.

The motor 5 may be of the type which is provided with two field coils, one for operating it in either direction, one end of each of the field coils being connected by a common wire 10 to one side of a current supply line. The other ends of each of the field coils of the motor 5 may be connected by wires 11 and 12 respectively with contact points 13 and 14 positioned at relatively opposite points adjacent to the thermostatically operated contact member 15.

The other side of the above-mentioned current supply line used for operating the motor 5 may be connected by a wire 16 in any desired manner, as through a suitable flexible pigtail, to the contact member 15, whereby when the contact member is moved to the left or right, as seen in the drawing, a circuit will be completed through the motor 5 in one direction or the other, as hereinafter more specifically to be described. The contact member 15 is further provided with a suitable bridging member 17, shown as a spring and adapted to bridge the gap between contact points 18 and 19 upon movement of the contact member 15 to the right, as seen in the drawing.

Contact point 18 is connected by a wire 20 to one side of the solenoid coil 9. Contact point 19 is connected by a wire 21 to some suitable source of power, here diagrammatically indicated as a battery 22, the other terminal of this source of power or battery being connected to the other side of the solenoid coil 9 by a wire 23.

The contact member 15 is adapted to be moved by a thermostat A positioned to be responsive partly to the effect of the heating or cooling means, including the heating elements 1 to 4 and the muffle flues through which the cooling air is to be passed, and partially also to the temperature of the ware being treated. In a broad sense, therefore, the thermostat A may be considered as a means responsive to the magnitude of the supply condition in the system broadly outlined above. Thermostat A, indicated diagrammatically in the accompanying drawing, is preferably of the type disclosed in detail in the patent to Mulholland and Honiss, No. 1,866,366, issued July 5, 1932, and includes an outer tube of relatively high expansive material, such as nickel, and a rod or inner tube of a material of little or no expansivity, such as fused silica, these members being fastened together at one end and allowed to expand independently of each other in a manner not illustrated in the accompanying drawing.

As shown, thermostat A comprises a casing 24 adapted to be fixed to some suitable fixed part of the apparatus as one side of the lehr of the Wadman application above referred to. To this casing is secured the tube 25, such as the nickel tube above referred to, and within this tube is a rod or smaller tube 26 which may be of fused silica, the tube and rod 25 and 26 being fastened together at their inner ends (to the left, as seen in the drawing and in a manner not shown).

As shown, the rod 26 bears against a slidingly mounted rod 27, which is spring-pressed toward the member 26 by means of a helical compression spring 28 extending between one side of the member 24 and a collar 29 secured to the rod 27. A member 30 is threaded on the rod 27 and is provided with a stud 31 bearing against the contact member 15, which member may be flexible or may be pivoted at or near the casing 24. Any suitable means, such as the tension spring 32 extending between the contact member 15 and a fixed anchorage 33, may be used to retain the contact member 15 always in engagement with the stud 31 and to move it to the right, as seen in the drawing when such action is permitted by the position of the stud 31. The lower end of the member 30, as seen in the drawing, is slidingly received in a guide 34 which prevents its rotation. Thus when the thermostat cools off and more heat is required at the point at which the thermostat is located, the tube 25 will contract, causing the member 26 to move the rod 27 to the right, as seen in the drawing, against the compression of the spring 28. This will also move the stud 31 to the right and thereby permit the movement of the contact member 15 to the right under the influence of the spring 32. If the thermostat is too highly heated, the reverse action will take place and the spring 28 will cause the movement of the rod 27 to the left, which movement will be transmitted through the member 30 and stud 31 to the member 15, which will be moved to the left against the action of the spring 32.

The operation of the system thus far described is as follows: Assuming an initial condition of the apparatus and position of parts in which the member 15 is in neutral so that it does not contact with any of the contact points arranged adjacent thereto, the dampers controlled by the motor 5 are in a position permitting the flow of cooling air in proximity to the material, the temperature of which is to be regulated, and the current to the heating elements 1 to 4 is off, due to the fact that the switch 8 is open. If, under these circumstances, the material being treated is too cool and the thermostat A starts to cool off, the tube 25 will contract causing a movement of the rod 26 to the right as seen in the drawing, which as above described will cause the contact member 15 to move to the right. The first action takes place when the contact member is moved to such a point that the contact spring 35 secured thereto, which is connected with the wire 16, engages the contact point 14. A circuit is then completed as follows: starting with wire 16 through contact spring 35, contact point 14, wire 12, motor 5, and wire 10, back to the line. This circuit serves to start the operation of the motor 5 in such a direction as to close the dampers associated therewith by a part rotation thereof, as by 180° rotation of a suitable crank connected to the motor. It will be understood that even if the movement of the contact member 15 should break the connection between the contact spring 35 and contact point 14 at any time before the completion of the damper movement by the motor 5, the circuit to the motor to move it in the direction to close the dampers will be maintained by a suitable maintaining switch and will be positively cut off by a suitable cut-off or limit switch after the motor has rotated the damper through the desired angle. The result of this action is that the draft will be cut off through the flues adjacent to the path of the material to be treated.

If the temperature at the thermostat A is still too low so that the contact member 15 is moved further to the right, as above described, the spring member 35 will yield sufficiently to permit such movement, and the bridge member 17 will be moved to connect the contact points 18 and 19. A circuit will then be completed as follows: from the battery 22 through wire 21, contact point 19, bridge member 17, contact point 18, wire 20, solenoid coil 9, and wire 23 back to the battery 22. Thus the solenoid coil 9 will be energized to close the switch 8 and to connect the heating elements 1, 2, 3 and 4 with the line wires 6 and 7 which will supply heat to the material being treated.

It will be understood that while I have disclosed a system including the positive supplying or positive abstraction of heat and means for accomplishing the same, the method involved in my invention and the apparatus for carrying out the same may be applied to the controlling of but a single means and may be applied to a variation up or down in such single means as desired and within the scope of the present invention. For example, the system could be applied to the control of fuel supply to a burner, as illustrated in the Wadman Patent 1,802,991, above referred to.

Returning now to the operation of the particular system disclosed, when the thermostat A has been sufficiently heated so that the tube 25 again expands and the contact member 15 starts moving to the left from its extreme right-hand position as seen in the drawing, under the influence of the mechanism above described, the first occurrence is the breaking of the circuit including the bridging member 17 and contact points 18 and 19, which will cause the de-energization of the coil 9, this in turn causing the opening of the circuit to the heating elements 1, 2, 3 and 4, thus cutting off the further supplying of heat to the material being treated.

Upon further movement of the member 15 to the left as seen in the drawing, due to the continued heating up of the elements of thermostat A, the contact will be broken between the spring 35 and contact point 14. When this occurs, nothing further happens, as presumably the motor 5 has ceased to operate in a direction to close the associate damper or dampers. Even if this damper-closing movement has not been completed, the action of closing the damper or dampers will be continued and completed by the motor 5 under control of the maintaining switch and cut-off switch above referred to.

Assuming now that the thermostat A is further heated up so that in the example being described positive cooling is called for, the contact member 15 will be moved further to the left as seen in the drawing until the contact spring 36 engages the contact point 13. At this time a circuit will be completed from the main current supply line through wire 16, contact spring 36, contact point 13, wire 11, motor 5, and wire 10 back to the line. The motor 5 will thus be actuated in the opposite direction from that above described and will be effective to open the dampers by operating in such reverse direction. It will be understood that the maintaining switch and limit switches are similarly effective to cause a continued movement of the motor sufficient to open the dampers, and there to stop such movement. Thus the draft of cooling air has again been started through the muffle flues so that from the standpoint of the temperature-affecting mechanism, as the lehr and its heating and cooling means, the original conditions have been restored.

If now the thermostat A commences to cool again, the contact member 15 will be moved back toward its neutral position, and in the course of such movement contact will be broken between the contact spring 36 and contact point 13. This will have no effect upon the action of the motor 5 due to the use of the maintaining switch above described and the cut-off switch, so that this breaking of the circuit by movement of the contact member 15 to neutral will nearly restore the original conditions of the automatic control means thus far explained.

With the contact member 15 in the neutral position, the heating elements 1 to 4 are always inactive, and the dampers associated with the motor 5 may be either open or closed to establish or cut-off draft through the cooling flues, according as the contact member 15 was to the left or right respectively of its neutral position immediately prior to its being at the neutral position.

Thus far I have described what may be termed the "primary" circuit for operating the alternative heating or cooling controls. I provide also what may be termed a "secondary" circuit, or circuit for controlling the primary circuit, preferably in a manner similar to that disclosed in the patent to Wadman No. 1,802,991 above referred to. It will be understood from the foregoing description that the primary circuit will control the addition or abstraction of heat and thus vary the temperature condition in response to variation of the actual temperature at the thermostat A from a predetermined temperature range, this range being that in which thermostat A is adapted to operate and being in practice perhaps two or three degrees. This range, however, may be changed or varied by varying both limits thereof similarly, that is, in the same direction and in corresponding amounts. In practically accomplishing this variation, I prefer to vary the relative positions of the rod 27 and member 30 by rotating the rod 27 with respect to this member.

This is preferably accomplished automatically, as in the Wadman patent above referred to, by means of a motor 37 which is suitably geared to the rod 27, as diagrammatically illustrated in the drawing, although in practice a relatively high gear reduction is used.

For operating the motor 37 in one direction or the other I preferably employ automatic means responsive to a thermostat A', although it is to be considered within the purview of this invention that manual means may be used to operate the motor 37 in accordance with the indicated condition at the point at which the desired selected condition is to be established and maintained. The thermostat A', utilized when the system is used in controlling temperatures, is located so as to be responsive predominantly to the temperature of the material to be treated, substantially at the point at which the predetermined selected condition is to be maintained. When the system is used in connection with a glass annealing lehr, as disclosed in the Wadman application above referred to, thermostat A' is located adjacent to the path of movement of the glassware at a point along this path beyond that at which thermostat A is located and substantially out of the direct influence of the heating or cooling means, and further so as to be responsive predominantly to the temperature of the ware to be annealed. Thermostat A' is preferably of the same type as thermostat A, and is adapted to operate a contact member 38 in the same manner that thermostat A operates contact member 15, the essential difference being however that the range for thermostat A' is manually adjustable by a hand wheel 39 secured to the threaded rod or shaft 40, which corresponds to the rod 27 of thermostat A. In connection with thermostat A' and motor 37 a cam mechanism is used comprising cams 41 and 42 mounted upon a common shaft, these cams being arranged to be driven by a motor 43.

Suitable speed reducing means are preferably interposed between the motor 43 and the common shaft on which cams 41 and 42 are mounted, and preferably these cams are rotated at a speed which, while it may be variable, will be of the order of one revolution in ten minutes. It will be understood, however, that this speed may be changed by changing the gear train interposed between the armature of the motor 43 and the common shaft upon which cams 41 and 42 are mounted. The particular speed referred to is, however, chosen as approximately that of a single revolution of the cams in about the time it takes the ware to pass between points opposite thermostats A and A' respectively plus the time for heat to be transmitted from the heating or cooling means to the ware and from the ware to thermostat A' to influence this thermostat.

The contact member 38 is provided with pairs of spring contact members 44—45 and 46—47, all of which contact members 44 to 47 inclusive are in effect connected together due to the construction of the contact member 38 of some conducting material. Current is supplied to the secondary circuit from line wires 48 and 49. The wire 49 is connected by a wire 50 with the conducting contact member 38, so that each of the contact springs 44 to 47 inclusive is at all times connected to the wire 49. Contact springs 44 to 47 inclusive are arranged to make contact with points 51, 52, 53 and 54 respectively. The motor 43 is connected directly across the line so as to be continuously in operation, one side of the motor being connected by a wire 55 with the wire 48, and the other side being directly connected to the wire 49. Each of the cams 41 and 42 is provided with a protrusion which is adapted to close an associated switch once during each revolution of the cams. The length of this protrusion may be made variable in any manner well known in the art and not herein specifically illustrated. Cam 41 controls a switch including contact members 56 and 57, and cam 42 controls a switch including contact members 58 and 59.

One side of each of the switches controlled by cams 41 and 42, to wit, switch contacts 57 and 59, are connected with contact points 53 and 54 respectively by wires 60 and 61. The motor 37 is, as above stated, a reversible motor, and may include two field windings, one side of each of which is connected by a common wire 62 with one side of the line, wire 48, through a switch mechanism later to be described. For the purposes of the present description it may assumed that wire 62 and wire 48 are normally connected together, although this connection may be interrupted at times by switch mechanism subject to movement of the contact member 15, as will hereinafter appear. The other sides of each of the field windings of motor 37 are connected respectively by wires 63 and 64 with contact points 51 and 52, and the wires 63 and 64 are connected respectively by wires 65 and 66 to the other sides of the switches controlled by cams 41 and 42, that is, switch contacts 56 and 58 respectively.

Considering now the ordinary operation of the secondary circuit as controlling the motor 37 to adjust the range of the primary circuit, and starting with the contact member 38 in neutral, so that no contacts are made on either side thereof, the motor 43 is continuously in operation as it is connected directly across the supply line, and the protrusions of cams 41 and 42 periodically close the associated switches, including contacts 56—57 and 58—59, and assuming that the material to be treated is cooling down, so that the temperature at the point at which thermostat A' is located is falling below the predetermined desired temperature at this point, which will result in a movement of the contact member 38 to the right as seen in the drawing. The first action occurs when contact is made between contact spring 47 and contact point 54. At this time a circuit may be completed as follows (assuming that the cam 42 is at such a position that the protrusion thereof closes the switch, including contacts 58 and 59): starting at one side of the line, wire 49 through wire 50, contact member 38, contact spring 47, contact point 54, wire 61, contact 59, contact 58, wire 66, wire 64, motor 37, and wires 62 and 48 to the other side of the line. The motor 37 will thus be actuated in one direction as long as the contact points 58 and 59 are retained in engagement, which time will be subject to the configuration of cam 42 and will be measured also by the rate of rotation of the cam under the influence of the motor 43.

The actuation of the motor 37 will be of an intermittent character and will be only for a predetermined time during each rotation of the cam 42. This will cause but a small corrective change in the range of thermostat A due to a small variation between the temperature at thermostat A' and the predetermined range of that thermostat. If this small variation continues in approximately the same degree, contact spring 47 will be retained against contact point 54 and the small corrective change will be repeated periodically as long as this condition exists.

If, however, the correction on the first or some subsequent revolution of the cam 42 furnishes a sufficient correction of the range of thermostat A, the contact member 38 will return to its neutral position, thus bringing to an end the intermittent corrective changes of the range of thermostat A, as above described. As before stated, the timing of the rotation of cams 41 and 42 under the action of the motor 43 will be such that a corrective change made on the range of thermostat A by the operation of the motor 37 will have time to be felt at thermostat A' before another and succeeding correction will be made.

If, however, the variation between the temperature of the material being treated, that is, the temperature adjacent to thermostat A', and the set range for that thermostat is relatively larger in degree, so that the contact member 38 is moved still further to the right as seen in the drawing, contact spring 45 will engage contact point 52, which will complete a continuous circuit to the motor 37 for the time this condition exists, that is, for the time the actual temperature varies by at least a certain predetermined amount from the set range of thermostat A'. This continuous circuit may be traced out beginning with one side of the line, wire 49, through wire 50, contact member 38, contact spring 45, contact point 52, a portion of wire 66, wire 64, motor 37, and wires 62 and 48 to the other side of the line. Thus the correction of the range of thermostat A effected by the motor 37 will be continuous as long as the contact spring 45 remains in engagement with contact point 52.

Assuming now that contact member 38 is in its extreme right-hand position as seen in the drawing and contact springs 45 and 47 are engaged with their respective contact points 52 and 54, and now that the correction of the range of thermostat A made as above described is sufficient and the material to be treated is sufficiently heated, so that thermostat A' is influenced thereby and commences to move the contact member 38 toward the left from its extreme right-hand position, the first action occurs when the contact spring 45 breaks contact with its point 52. At this time the continuous operation of the motor 37 is brought to an end and the motor may be operated solely under control of the intermittent operating means, including the cam 42 and the switch controlled thereby.

Upon further movement of the contact member 38 to the left, contact spring 47 will break from its contact point 54, thus opening the circuit through which the motor 37 was operated intermittently and bringing to an end all corrective change of the range of thermostat A by the secondary circuit, whether or not the protrusion of the cam 42 is in position to close the switch contacts 58 and 59. The contact member 38 has now assumed neutral position and the original status of the circuit is regained.

If, however, the material to be treated is still too hot and the contact member 38 continues to be moved to the left as seen in the drawing from the neutral position, the first occurrence is the engagement of contact spring 46 with contact point 53. At this time the motor 37 will be operated in the opposite direction from that above described and in an intermittent manner by a circuit which may be traced as follows: starting with one side of the line, wire 49, through wire 50, contact member 38, contact spring 46, contact point 53, wire 60, switch contact 57, switch contact 56 (assuming that these switch contacts are engaged due to the position of the protrusion of cam 41), wire 65, wire 63, motor 37, and wires 62 and 48, to the other side of the line.

Upon further movement of the contact member 38 to the left, as seen in the drawing, contact spring 44 will engage contact point 51, completing a continuous circuit through the motor 37 to operate it in the same direction as its last described intermittent rotation, the continuous circuit here completed being traceable as follows: starting with one side of the line, wire 49, through wire 50, contact member 38, contact spring 44, contact point 51, wire 63, motor 37, and wires 62 and 48 to the other side of the line. This continuous operation of the motor 37 is exactly analogous to that first described, except that it is in the opposite direction, that is, tending to vary the range of thermostat A to decrease heating or increase cooling. The return of the contact member 38 from its extreme left-hand position back to neutral is accompanied by operations corresponding to those described above in connection with its return from its extreme right-hand position back to neutral.

Thus far I have described the normal operations of the primary and secondary circuits. From a practical standpoint, the effect of the secondary circuit upon the primary circuit in adjusting the range in which the thermostat A operates is sometimes too rapid, especially where the temperature existing at the thermostat A' is such as to cause continuous operation of the motor 37 in one direction or the other, as above described. It has been found, for example, that range adjustments by the motor 37 may be practically operative to move the contact member 15 directly a material distance to one side or the other, so that when a reverse movement is called for, there is a material delay or lag before this reverse adjustment makes itself felt by actual movement of the contact member 15 to vary the temperature affecting means. This delay or lag in the adjustments in one direction and the other from a practical standpoint may result in what may be termed "hunting", that is, in the temperature of the material at the point at which it is desired to maintain this temperature constant wandering first to one side and then to the other of the desired temperature rather than being maintained substantially at the desired temperature. What may be termed the primary object of the present invention, therefore, is to obviate this difficulty and particularly to accomplish this result by limiting the adjustments of the range of thermostat A by the secondary circuit to small amounts at any one time, and preferably to limit it in such a manner that the average point or mean of this range is never more than a predetermined amount or amounts in one direction or the other from the actual conditions as registered by thermostat A.

More specifically, it is desired to cut off the operation of the motor 37 whenever the direct action of this motor tends to move the contact member 15 more than a predetermined amount in one direction or the other from its neutral position. In accomplishing this result, contact member 15 is provided with a pair of contact springs 67 and 68 which are adapted normally to make contact with adjustable contact points 69 and 70 respectively. Wire 48 is connected directly to the contact point 69 and wire 62, to the contact point 70. Contact points 69 and 70 are preferably constructed as set screws which may be turned to a desired position toward the neutral position of contact member 15. Thus, a circuit is normally complete from wire 48 through contact point 69, contact springs 67 and 68, and contact point 70, to wire 62. If, however, it is attempted to move the contact member 15 in one direction or the other more than a predetermined amount from its neutral position, contact will be broken either between contact spring 67 and contact point 69 or between contact spring 68 and contact point 70, according as the contact member 15 is moved to the right or left respectively from its neutral position. Thus, for example, should a continuous circuit in one direction or the other be completed through the motor 37 for adjusting the range of thermostat A, or even should sufficient intermittent operations of this motor be made to move the contact member 15 a sufficient distance to the right or left of its neutral position, as seen in the drawing, contact will be broken as aforesaid between wires 48 and 62 until the actual conditions at thermostat A are such that it moves the contact member 15 toward neutral before any further range correction may be made. This means has been found in practice to be effective in minimizing and/or preventing time lag and consequent "hunting" of the system, as above described.

It will be obvious that the limiting arrangement for range adjustment of thermostat A by motor 37 will be equally effective whether the normal operation of this motor is accomplished automatically by means such as here shown and described in the so-called "secondary" circuit, or whether the motor 37 be operated manually by an operator according to his judgment as to what adjustment should be made, presumably based upon some indication of conditions at the point at which it is desired to maintain the predetermined condition.

It will further be seen that my present invention is applicable not only to the control of temperature in a glass annealing lehr or elsewhere, but generally in controlling the magnitude of any condition whether physical or chemical in which the magnitude of the condition to be controlled and maintained is effected by directly controlling the magnitude of a supply condition and in which the magnitude of this supply condition is an index of the variation of the means which affect that magnitude and in which the range in which such means operate is adjustably variable in accordance with the actual magnitude existing at the point at which a condition of predetermined magnitude is to be maintained. I do not wish to be limited, therefore, except by the scope of the appended claims which are to be construed as broadly as the state of the prior art permits.

I claim:

1. Apparatus for controlling the magnitude of a condition tending to the establishment and maintenance of a predetermined magnitude therefor, comprising means responsive to the magnitude of the condition at the point at which the predetermined magnitude is to be established and maintained, means for varying the magnitude of a supply condition which is a directly contributing factor to the magnitude of the first named condition, other and distinct means responsive to the magnitude of said supply condition, means controlled by said other and distinct means for controlling the magnitude of said supply condition in response to variations thereof from a range of magnitudes, means adapted to be controlled in response to variations of the magnitude of the first named condition from its predetermined magnitude for varying the limits of said range similarly, and means for limiting the adjustment of said range at any time to predetermined differences in one direction and the other between the means thereof and the then existing magnitude of said supply condition.

2. Apparatus for controlling the magnitude of a condition tending to the establishment and maintenance of a predetermined magnitude therefor, comprising means responsive to the magnitude of the condition at the point at which the predetermined magnitude is to be established and maintained, means for varying the magnitude of a supply condition which is a directly contributing factor to the magnitude of the first named condition, other and distant means responsive to the magnitude of said supply condition, means controlled by said other and distinct means for controlling the magnitude of said supply condition in response to variations thereof from a range of magnitudes, means operating automatically in response to variations of the magnitude of the first named condition from its predetermined magnitude for varying the limits of said range similarly, and means for limiting the adjustment of said range at any time to predetermined differences in one direction and the other between the mean thereof and the then existing magnitude of said supply condition.

3. Apparatus for controlling the magnitude of a condition tending to the establishment and maintenance of a predetermined selected magnitude therefor, comprising means responsive to the magnitude of the condition at a point at which the predetermined selected magnitude is to be established and maintained, means for varying the magnitude of a supply condition which is a directly contributing factor to the magnitude of the first named condition, other and distinct means responsive to the magnitude of said supply condition, means controlled by said other and distinct means for controlling the magnitude of said supply condition in response to variations thereof from a range of magnitudes, means operating automatically in response to variations of the magnitude of the first named condition from its predetermined selected magnitude for varying the limits of said range similarly, means for limiting the adjustment of said range at any time to predetermined differences in one direction and the other between the mean thereof and the then existing magnitude of said supply condition, and means for manually varying the operation of certain at least of the above named means to vary as desired the magnitude of the condition to be established and maintained.

4. Apparatus for controlling the magnitude of a condition tending to the establishment and maintenance of a predetermined magnitude therefor, comprising means responsive to the magnitude of the condition at the point at which the predetermined magnitude is to be established and maintained, means for varying the magnitude of a supply condition which is a directly contributing factor to the magnitude of the first named condition, other and distinct means responsive to the magnitude of said supply condition, means controlled by said other and distinct means for controlling the magnitude of said supply condition in response to variations thereof from a range of magnitudes, means operated automatically in response to variations of the magnitude of the first named condition from its predetermined magnitude for varying the limits of said range similarly, the last named means being intermittent in its action when the variations of magnitude to which it is responsive are relatively small and continuous when those variations are relatively larger, and means for limiting the adjustment of said range at any time to predetermined differences in one direction and the other between the mean thereof and the then existing magnitude of said supply condition.

5. Apparatus for controlling the temperature of moving material tending to the establishment and maintenance of a predetermined temperature for the material at a predetermined point in its path of movement, comprising means responsive predominantly to the temperature of the material at said point, means for varying the temperature conditions adjacent to the path of the material at a point in its path of movement prior to the first named point, other and distinct means responsive to the temperature at the second named point, means controlled by said other and distinct means for controlling the temperature conditions at said second named point in response to variations thereof from a range of temperatures, means operating automatically in response to variations of the temperature at the first named point from the desired temperature at that point for varying the limits of said range similarly, and means for limiting the adjustment of said range at any time to predetermined differences in one direction and the other between the mean thereof and the then existing temperature at said second named point.

6. Apparatus for controlling the temperature of moving material tending to the establishment and maintenance of a predetermined temperature for the material at a predetermined point in its path of movement, comprising means responsive predominantly to the temperature of the material at said point, means for varying the temperature conditions adjacent to the path of the material at a point in its path of movement prior to the first named points, other and distinct means responsive to the temperature at the second named point, means controlled by said other and distinct means for controlling the temperature conditions at said second named point in response to variations thereof from a range of temperatures, means operating automatically in response to variations of the temperature at the first named point from the desired temperature at that point for varying the limits of said range similarly, the last named means being intermittent in its action when the variations of temperature to which it is responsive are relatively small and continuous when those variations are relatively larger, and means for limiting the adjustment of said range at any time to predetermined differences in one direction and the other between the mean thereof and the then existing temperature at said second named point.

7. Apparatus for controlling the temperature of moving material tending to the establishment and maintenance of a predetermined temperature for the material at a predetermined point in its path of movement, comprising a thermostat responsive predominantly to the temperature of the material at said point, means for varying the temperature conditions adjacent to the path of the material at a point in its path of movement prior to the first named point, a second thermostat responsive to the temperature at the second named point, means including electric circuits controlled by said second thermostat for controlling said temperature varying means in response to variations of the temperature at said second thermostat from a range of temperatures, means including a reversible electric motor and a system of electric circuits operated automatically in response to variations of the temperature at the first named thermostat from the desired temperature at which the material is to be maintained for varying both limits of said range similarly, and means for breaking any circuit through said motor when it is acting to adjust the limits of said range when the mean of said range is different from the then existing temperature at said second named thermostat by predetermined amounts in one direction or the other.

8. Apparatus for controlling the temperature of moving material tending to the establishment and maintenance of a predetermined temperature for the material at a predetermined point in its path of movement, comprising a thermostat responsive predominantly to the temperature of the material at said point, means for varying the temperature conditions adjacent to the path of travel of the material at a point in said path prior to the first named point, a second thermostat responsive to the temperature at the second named point, a reversible electric motor for varying both limits between which said second thermostat operates in the same direction and amount in either direction, a system of electric circuits operating automatically in response to variations of the temperature at the first named thermostat from the predetermined range in which it operates for operating said motor intermittently in a corrective direction when these variations are relatively small and continuously in a corrective direction when these variations are relatively larger, and means for interrupting all circuits through said motor when the setting of said range by the operation thereof differs by a predetermined amount in either direction from the temperature at said second named thermostat.

9. The method of controlling the magnitude of a condition tending to the establishment and maintenance of a predetermined magnitude therefor, comprising the steps of varying the magnitude of a supply condition which is a directly contributing factor to the magnitude of the condition to be established and maintained in response to differences between the magnitude of said supply condition and a range of magnitudes, adjustably varying both limits of said range similarly in response to differences between the actual magnitude of the condition to be maintained and the desired magnitude thereof, and limiting the adjustments of said range to predetermined values of difference between the mean of said range at any time and then then existing magnitude of said supply condition.

10. The method of controlling the magnitude of a condition tending to the establishment and maintenance of a predetermined magnitude therefor, comprising the steps of varying the magnitude of a supply condition which is a directly contributing factor to the magnitude of the condition to be established and maintained in response to differences between the magnitude of said supply condition and a range of magnitudes, adjustably varying both limits of said range similarly and in an intermittent manner in response to relatively small differences between the actual magnitude of the condition to be maintained and the desired magnitude thereof and continuously when and as long as such differences between the actual and desired magnitudes of the condition to be maintained exceed predetermined values in one direction or the other, and limiting the adjustments of said range to predetermined values of difference between the mean of said range at any time and the then existing magnitude of said supply condition.

11. The method of controlling the temperature of moving material tending to the establishment and maintenance of a predetermined temperature for the material at a predetermined point in its path of movement, comprising the steps of varying the temperature conditions adjacent to the path of the material at a point in its path of movement prior to the first named point in response to differences between the actual temperature at the second named point and a range of temperatures, automatically adjustably varying both limits of said range similarly in a corrective direction in response to differences between the actual temperature of the material at the first named point and the desired temperature at that point, and limiting the adjustment of said range at any time to predetermined differences in one direction and the other between the mean thereof and the then existing temperature at the second named point.

HAROLD L. EASTMAN.